United States Patent
Lanard et al.

(10) Patent No.: US 7,011,360 B2
(45) Date of Patent: Mar. 14, 2006

(54) FRONT PANEL OF A MOTOR VEHICLE COMPRISING A BUMPER BEAM

(75) Inventors: Jean-Louis Lanard, Feucherolles (FR); Pascal Harand, Trappes (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 10/489,791

(22) PCT Filed: Sep. 27, 2002

(86) PCT No.: PCT/FR02/03299

§ 371 (c)(1),
(2), (4) Date: Mar. 16, 2004

(87) PCT Pub. No.: WO03/029068

PCT Pub. Date: Apr. 10, 2003

(65) Prior Publication Data

US 2004/0239128 A1 Dec. 2, 2004

(30) Foreign Application Priority Data

Sep. 28, 2001 (FR) .................................. 01 12598

(51) Int. Cl.
*B60J 7/00* (2006.01)

(52) U.S. Cl. .................... 296/193.1; 293/115; 293/117; 180/68.6

(58) Field of Classification Search ........... 296/193.09, 296/193.1, 203.02; 293/117, 115; 180/68.4, 180/68.6
See application file for complete search history.

(56) References Cited

U.S. PATENT DOCUMENTS 6,761,242 B1 * 7/2004 Yoshida et al. ............. 180/298
2001/0026072 A1 * 10/2001 Sato et al. .................. 293/115

FOREIGN PATENT DOCUMENTS

| DE | 3841536 | * | 6/1990 |
| DE | 3930076 | * | 2/1991 |
| EP | 1095845 | * | 2/2001 |

* cited by examiner

Primary Examiner—Joseph D. Pape
(74) Attorney, Agent, or Firm—Ronald Courtney

(57) ABSTRACT

The invention relates to a front panel of a motor vehicle comprising a bumper beam and at least one heat exchanger. This heat exchanger (5) is located below the bumper beam (3) with a substantially vertical orientation and comprises, in a horizontal plane, an upper face having a shape similar to the shape of the bumper beam (3) such that the upper face is covered by the bumper beam (3).

17 Claims, 2 Drawing Sheets

FRONT PANEL OF A MOTOR VEHICLE COMPRISING A BUMPER BEAM

FIELD OF THE INVENTION

The invention relates to a front panel of a motor vehicle comprising a bumper beam.

BACKGROUND OF TEE INVENTION

A front panel of a motor vehicle is a structural component capable of integrating various equipments of the vehicle such as headlamps, flashing indicators, horn, heat exchanger, motorized fan unit or complete cooling unit, etc. The front panel, thus provided with its equipments, constitutes a unit module prepared and delivered by the equipment supplier in order to be fitted on the vehicle by the manufacturer.

The unit module is mounted on lateral structural components of the vehicle, such as the side members or the wings, and then the frontal shield or bumper, for example, is fitted onto the module.

In the technique of the prior art, heat exchangers are disposed between the front panel and the bumper beam. Furthermore, these heat exchangers are located a few centimeters behind the bumper beam for reasons of efficiency and noise and, finally, in order they are not damaged in the event of a frontal collision. This technique has a major disadvantage of overall dimensions. Furthermore, these heat exchangers mostly consist of cores that are flat and of large area. Furthermore, they cannot easily be placed elsewhere.

SUMMARY OF THE INVENTION

A particular purpose of the invention is to overcome the abovementioned disadvantages.

For this purpose, the invention relates to a front panel of a motor vehicle comprising a bumper beam and at least one heat exchanger.

According to the invention, the heat exchanger is located below the bumper beam with a substantially vertical orientation.

It will be observed that the location of the heat exchanger below the bumper beam allows optimization of the overall dimensions.

In a particular embodiment of the invention, the heat exchanger comprises, in a horizontal plane, an upper face having a shape similar to the shape of the bumper beam such that the upper face is covered by the bumper beam.

More particularly, the upper face of the heat exchanger comprises a straight central region of specified length and two incurved end regions each having a tangent at their end forming an acute angle with the straight central region in the horizontal plane.

More particularly, the said acute angle is between 0° and 45°.

Furthermore, in a particular embodiment of the invention, the specified length of the straight central region is greater than one third of the lateral distance between the ends of the upper face.

According to one aspect of the invention, the upper face of the heat exchanger has a developed length greater than the height of the heat exchanger.

According to an advantageous embodiment of the invention, the heat exchanger is recessed with respect to the bumper beam.

According to another advantageous embodiment of the invention, the front panel comprises a lower beam capable of protecting a pedestrian in the event of a frontal collision with the latter.

According to one aspect of the invention, the heat exchanger has a developed length b greater than the distance between the lower side members (SMD) of the vehicle.

According to one embodiment of the invention, the front panel of a motor vehicle comprises a median zone located above the bumper beam and free of any element likely to offer resistance in the event of a frontal collision.

According to one aspect of the invention, the front panel comprises two horizontal cross-pieces (24) located to the left and to the right respectively of the median zone, above the bumper beam, and connected to each other by a deformable link (23).

In one embodiment of the invention, the deformable link (23) is a cable.

In another embodiment of the invention, the deformable link (23) is a beam.

According to another aspect of the invention, the median zone comprises elements capable of absorbing energy in the event of a frontal collision.

BRIEF DESCRIPTION OF THE DRAWINGS

Other features and advantages of the invention will become apparent on examining the following detailed description and the appended drawings in which.

DETAILED DESCRIPTION OF THE PREFERRED EMBODIMENTS

Figure 1:
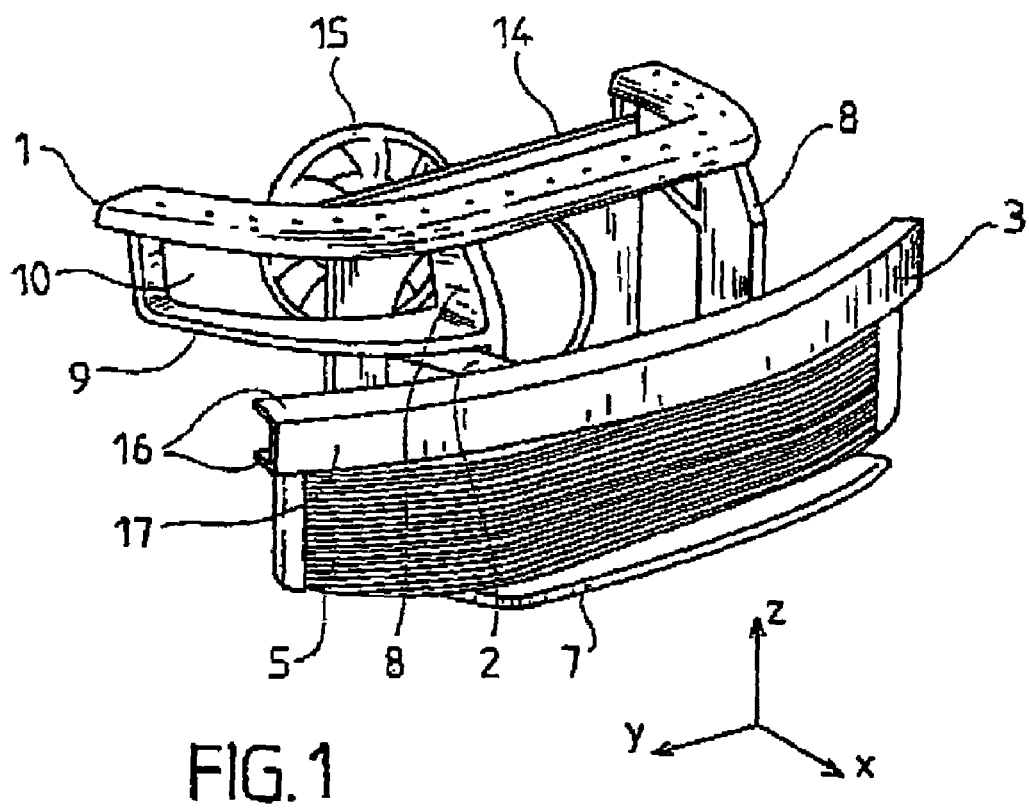
FIG. 1 is a perspective view of a front panel according to the invention.

Reference will firstly be made to FIG. 1. The front panel of a motor vehicle shown in this figure comprises an upper cross-piece 1 whose ends are bent and designed to be fixed onto upper side members (not shown) of the vehicle. Two vertical upright members 8 proceed from the cross-piece 1. Braces 9 are connected to the cross-piece 1 and to the upright members 8 in order to delimit the housings 10 intended to receive the vehicle's headlamps. The vertical upright members 8 are intended to be fixed to lower side members 2 of the vehicle.

Furthermore, the front panel comprises a bumper beam 3 fixed to the lower side members 2. In one possible embodiment, the bumper beam 3 is fixed to the side members 2 by screwing.

The front panel also comprises a lower beam 7, called the pedestrian beam, intended to protect a pedestrian in the event of a frontal collision with the latter. This beam can be fixed to the lower side members 2. In another possible embodiment, this lower beam can be fixed to the bumper beam 3.

In a known manner, a panel 14 surrounding a fan rotor 15 of a motorized fan unit is associated with the front panel.

According to the invention, a heat exchanger 5 is oriented substantially vertically below the bumper beam 3. In an example embodiment, the bumper beam 3 comprises fixing lugs and attachments for shock-absorbing studs (not shown) in order to fix the heat exchanger 5. In the embodiment shown in FIG. 1, the heat exchanger 5 stands on the lower beam 7. In an example embodiment, the lower beam 7 also comprises fixing lugs and attachments for shock-absorbing studs.

According to FIG. 1, the bumper beam 3 is, in this example, a profile having a substantially U-shaped cross-section. The bumper beam thus comprises a vertical web 17 and two horizontal, upper and lower, flanges 16 facing each other. This profile is advantageously made of metal and it has an incurved shape adapted to the shape of the bumper (not shown) which is intended to be fixed subsequently onto the bumper beam.

Figure 2:
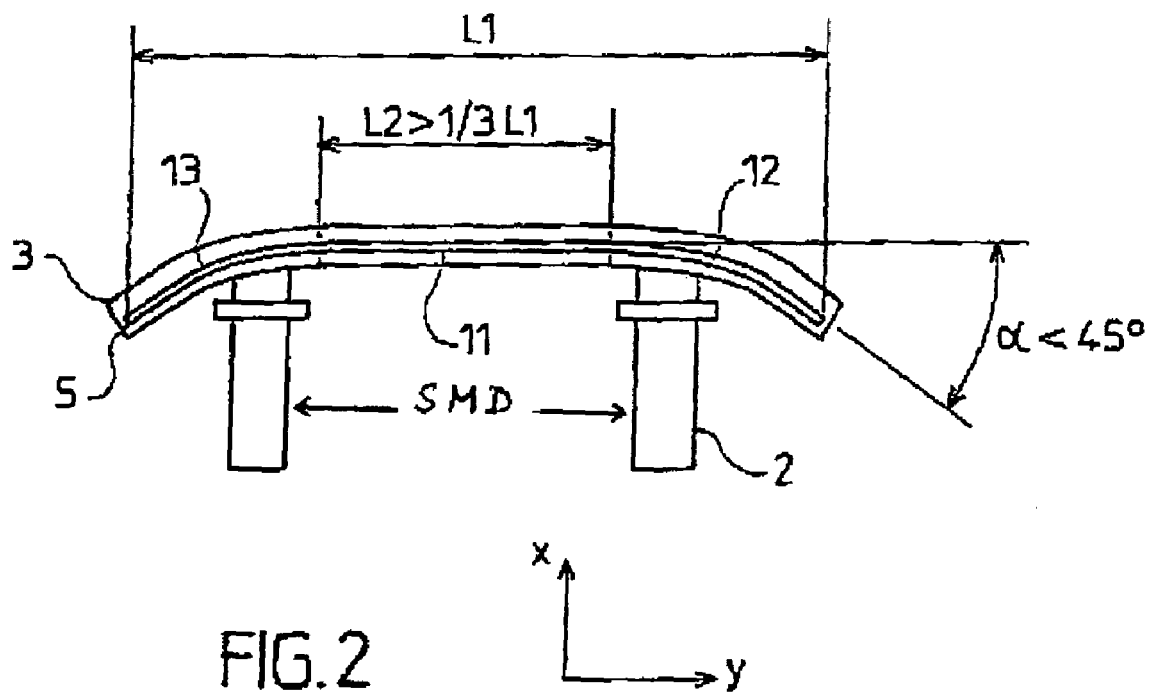
FIG. 2 is a partial plan view of the front panel according to the invention.

With reference to FIG. 2, the heat exchanger 5 comprises an upper face of shape similar to the shape of the bumper beam 3 in the horizontal plane XY such that the upper face is covered by the bumper beam. Thus, the upper face comprises a straight central region 11 and two end regions 12, 13 incurved towards the rear of the vehicle. If L1 represents the lateral distance between the ends of the upper face then, in an advantageous manner, the straight central region 11 is of length L2 such that L2>⅓ L1. As shown in FIG. 2, the tangent to the end of the end region forms an acute angle α with the straight central region 11 in the horizontal plane XY. Advantageously, the acute angle α is between 0° and 45°.

The heat exchanger 5, placed in the vertical projection of the bumper beam 3, is retracted with respect to the web of the bumper beam 3. Advantageously, the upper face of the heat exchanger 5 has a surface smaller than the surface of the lower flange 16 of the bumper beam. Thus, the heat exchanger 5, retracted with respect to the web 17 of the bumper beam 3, is placed below the lower flange 16 of the bumper beam.

Because of this, the heat exchanger is partially protected in the event of a weak frontal collision.

Figure 3:
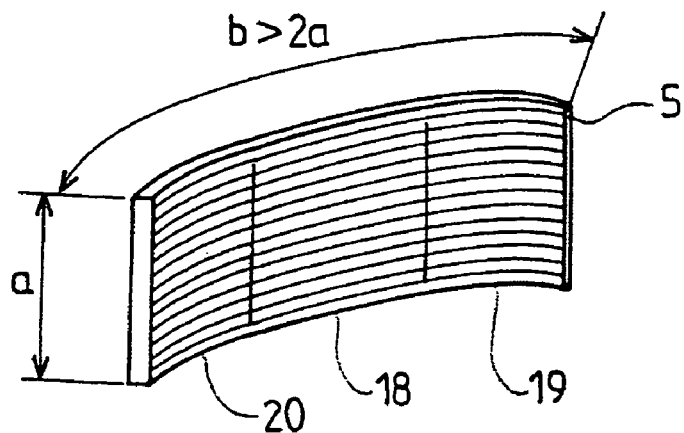
FIG. 3 is a perspective view of a heat exchanger designed to be associated with a front panel according to the invention.

The heat exchanger 5 is shown separately in FIG. 3. Thus, the heat exchanger 5 (for example a cooling radiator of the vehicle's engine) is advantageously divided into three sections disposed vertically and comprising a straight central section 18 and two end sections 19 and 20 incurved towards the rear of the vehicle. The straight central section 18 comprises the straight central region 11 as an upper surface. The end sections 19 and 20 respectively comprise the end regions 12 and 13 as an upper surface. In a particularly advantageous dimensioning of the heat exchanger 5, the developed length b of the upper face of the heat exchanger is greater than two times the height of that exchanger.

The geometry of the exchanger such as described makes it possible to obtain a large exchange surface and to increase the efficiency of the exchanger. The positioning of this incurved exchanger is particularly advantageous in terms of space-saving. In the event of a frontal collision on the bumper, this exchanger 5 is intended to absorb the collision energy by means of the surface of the deformable barrier represented by the surface of the heat exchanger 5 and the surface of the bumper beam. Furthermore, the position of the exchanger 5 makes it possible to clear a median zone, located higher than the bumper beam and immediately behind the hood of the vehicle, of any rigid component capable of offering resistance during a frontal collision and thus allowing, in particular, a better shock-absorbing of collisions with pedestrians.

Figure 4:
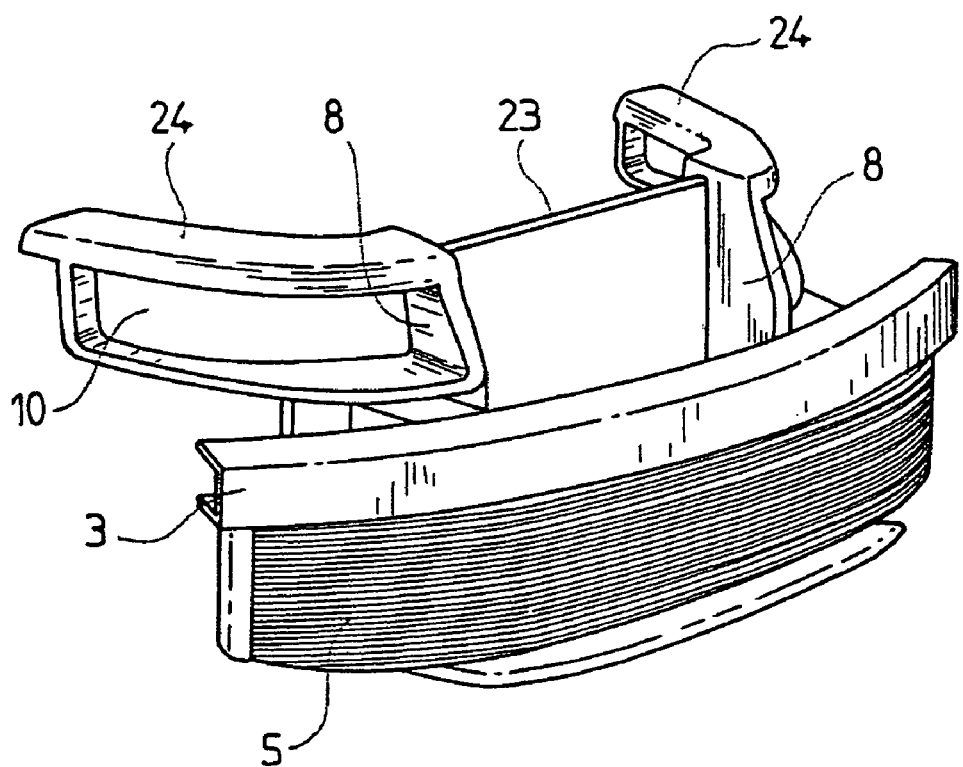
FIG. 4 is a perspective view of a front panel according to a variant embodiment of the invention.

FIG. 4 shows another embodiment in which the cross-piece 1 of FIG. 1 is replaced by two cross-pieces 24 each forming the upper limit of a housing 10. Each cross-piece 24 is limited by the vertical upright member 8 at one end. The two cross-pieces 24 are connected to each other by a link 23 that is easily deformable under the effect of a collision.

The link 23 connecting the two cross-pieces 24 is likely to collapse in the event of a violent collision on the bumper, whilst preventing a separation of the upper side members. In the illustrated embodiment, the link is a cable. In another embodiment, the link is a beam.

The zone located higher than the bumper beam and between the two cross-pieces is free of any rigid element, such as an engine cooling component or a hood closing component. This free zone can be used for housing components likely to be deformed or displaced during a frontal collision: reservoirs or an air filter for example.

The invention is not limited solely to the described and illustrated embodiments. Thus, the heat exchanger 5 located below the bumper beam 3 could advantageously be replaced by several heat exchangers placed side by side.

What is claimed is:

1. A front panel of a motor vehicle comprising a bumper beam and at least one heat exchanger, wherein the heat exchanger (5) is located below the bumper beam (3) with a substantially vertical orientation, and the heat exchanger (5) comprises, in a horizontal plane, an upper face having a shape similar to the shape of the bumper beam (3) such that the upper face is covered by the bumper beam (3).

2. The front panel of a motor vehicle as claimed in claim 1, wherein the upper face of the heat exchanger (5) comprises a straight central region (11) of specified length and two incurved end regions (12, 13) each having a tangent at their end forming an acute angle a with the straight central region (11) in the horizontal plane.

3. The front panel of a motor vehicle as claimed in claim 2, wherein the acute angle α is between 0° and 45°.

4. The front panel of a motor vehicle as claimed in claim 2, wherein the specified length (L2) of the straight central region (11) is greater than one third of the lateral distance (L1) between the ends of the upper face.

5. The front panel of a motor vehicle as claimed in claim 1, wherein the upper face of the heat exchanger has a developed length (b) greater than the height (a) of the heat exchanger.

6. The front panel of a motor vehicle as claimed in claim 1, wherein the heat exchanger (5) is recessed with respect to the bumper beam (3).

7. The front panel of a motor vehicle as claimed in claim 1, wherein it comprises a lower beam (7) capable of protecting a pedestrian in the event of a frontal collision with the latter.

8. The front panel of a motor vehicle as claimed in claim 1, wherein the motor vehicle has lower side members and the heat exchanger has a developed length (b) greater than the distance between the lower side members of the vehicle.

9. The front panel of a motor vehicle as claimed in claim 1, wherein it comprises a median zone located higher than the bumper beam and free of any element likely to offer resistance in the event of a frontal collision.

10. The front panel of a motor vehicle as claimed in claim 9, wherein it comprises two horizontal cross-pieces (24) located to the left and to the right respectively of the median zone and connected to each other by a link (23) that is easily deformable under the effect of a collision.

11. The front panel of a motor vehicle as claimed in claim 10, wherein the link (23) is a cable.

12. The front panel of a motor vehicle as claimed in claim 10, wherein the link (23) is a beam.

13. The front panel of a motor vehicle as claimed in claim 9, wherein the median zone comprises components capable of absorbing energy in the event of a frontal collision.

14. The front panel of a motor vehicle comprising a bumper beam and at least one heat exchanger, wherein the motor vehicle has lower side members, and the heat exchanger (5) is located below the bumper beam (3) with a substantially vertical orientation and the heat exchanger (5) is recessed with respect to the bumper beam (3), and wherein the heat exchanger has a developed length (b) greater than the distance between the lower side members of the vehicle.

15. The front panel of a motor vehicle comprising a bumper beam and at least one heat exchanger, wherein the heat exchanger (5) is located below the bumper beam (3) with a substantially vertical orientation and the heat exchanger (5) is recessed with respect to the bumper beam (3), and wherein it comprises a median zone located higher than the bumper beam and free of any element likely to offer resistance in the event of a frontal collision.

16. The front panel of a motor vehicle as claimed in claim 15, wherein it comprises two horizontal cross-pieces (24) located to the left and to the right respectively of the median zone and connected to each other by a link (23) that is easily deformable under the effect of a collision.

17. The front panel of a motor vehicle as claimed in claim 15, wherein the median zone comprises components capable of absorbing energy in the event of a frontal collision.

* * * * *

UNITED STATES PATENT AND TRADEMARK OFFICE
CERTIFICATE OF CORRECTION

PATENT NO. : 7,011,360 B2 Page 1 of 1
DATED : March 14, 2006
INVENTOR(S) : Lanard et al.

It is certified that error appears in the above-identified patent and that said Letters Patent is hereby corrected as shown below:

<u>Column 1,</u>
Line 9, replace "BACKGROUND OF TEE INVENTION" with -- BACKGROUND OF THE INVENTION --.

Signed and Sealed this

Second Day of May, 2006

JON W. DUDAS
*Director of the United States Patent and Trademark Office*